United States Patent Office 3,232,824
Patented Feb. 1, 1966

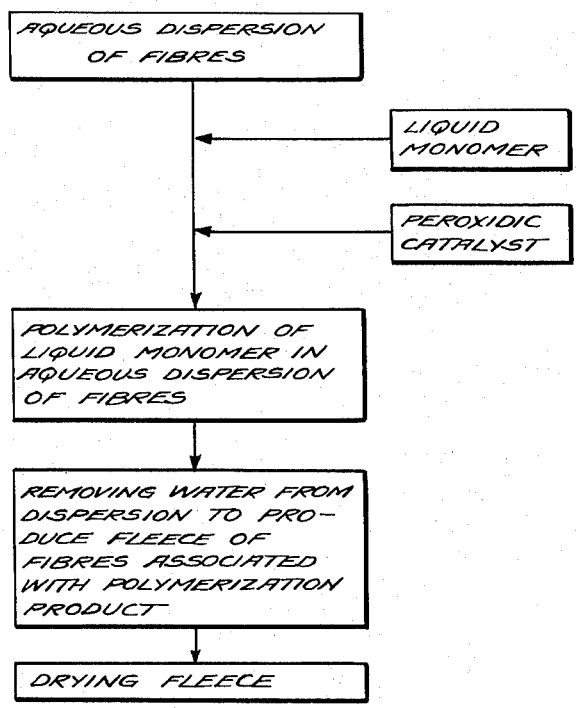

3,232,824
METHOD OF FORMING A WATER-LAID FIBROUS SHEET INCLUDING A THERMOPLASTIC RESIN
Erich Bäder, Hanau am Main, Germany, assignor to Deutsche Gold- und Silber-Scheideanstalt vormals Roessler, Frankfurt am Main, Germany
Filed July 5, 1962, Ser. No. 207,783
Claims priority, application Germany, July 15, 1961, D 36,577
8 Claims. (Cl. 162—169)

The present invention relates to an improved method for the production of fleeces and moldable materials from fibrous material.

The production of molded bodies, such as, for example, pressed plates from fibrous materials, such as, for example, wood fibres, asbestos and the like, using thermoplastic synthetic resins as bonding agents is known. For this purpose, the finely divided fibrous material is mixed with an aqueous dispersion of the finished synthetic resin and the product freed of water and then converted into the final molded body with the application of heat and pressure. The removal of water from the material in general is effected in filter apparatus. As the fine synthetic resin particles are not completely retained by the filtering apparatus employed, a loss of the synthetic resin powder occurs. Furthermore, the molded bodies produced from material prepared in this manner to a great degree are not homogeneous and this leads to low strengths and a high incidence of discards.

According to the invention it was found that fleeces and moldable materials can be prepared with the aid of suitable apparatus from fibrous materials and organic substances or mixtures of organic substances polymerizable to thermoplastic synthetic resins while avoiding the disadvantages indicated above if the fibres and at least one liquid monomer containing at least one terminal

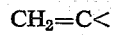

group are dispersed or respectively emulsified in an aqueous medium, and the monomer in such mixture polymerized in the presence of a peroxidic catalyst, preferably also in the presence of an accelerator, and subsequently removing the water to form a fleece which after drying may be molded with the aid of heat and pressure.

The monomeric liquid polymerizable organic compounds containing a terminal $CH_2=C<$ group advantageously can also be employed in admixtures with their homopolymers and/or copolymers and/or polymer mixtures. Such monomers or mixtures or solutions of polymers in monomers cure by vinyl polymerization in the process according to the invention. The polymerization products preferably are polymerized on the fibre particles and are very firmly bonded thereto. Such bonding cannot be achieved by treatment of the fibre particles with synthetic resins which have already been completely polymerized.

In carrying out the process according to the invention advantageously a dispersion of the fibrous materials in water can be prepared mechanically and the emulsion of the components forming the synthetic resin can be prepared separately with the aid of emulsifiers. Ionic and especially non-ionic emulsifiers can be used for the preparation of such emulsions and in some instances mixtures of both types have proved expedient. After preparation of such dispersion and emulsion they can be mixed with vigorous stirring. Preferably, the emulsion is added to the dispersion. After the mixture has been accomplished the emulsion of the polymerizable mixture may be broken.

It also is possible to effect the dispersion of the fibrous materials and the emulsification of the compounds to be polymerized simultaneously in the same vessel. In such case, for example, the polymerizable components containing the emulsifier may be poured into the water and the fibrous material added simultaneously before or after and the mixture thoroughly mixed. In every instance the catalyst or catalyst system is added in the monomeric component of the emulsion. Accelerator or activator components expediently are added only after production of the mixture of the fibre dispersion and the monomer or respectively monomer/polymer emulsion in order to prevent premature polymerization of the emulsion. Depending upon the type of the catalyst or catalyst system employed, the polymerization either occurs automatically at room temperature or only after the mixture is heated. It is expedient to maintain the dispersion in constant movement during the polymerization to avoid settling and excess adhesive bonding of the fibres.

After completion of the polymerization the solids are separated from the aqueous medium by known methods, for example, filtration, and the remaining water content removed by heating under drying conditions which, for example, can be effected in a drying channel. In such drying, temperatures should be avoided which are within the thermoplastic range of the polymer present on the fibrous material as in such instance the coalescence of the polymer can render the drying more difficult or even hinder such drying. It is, of course, also possible to effect the fleece formation before the polymerization is entirely completed. The fleece with the completely polymerized resin can be used as such or can be molded under heat and pressure directly or after storage. The molding can be effected on plate presses or calenders and in some instances extrusion molding can also be employed. The temperatures and pressures required depend upon the polymer contained in the fibrous product. For example, when methyl methacrylate in admixture with polymethyl methacrylate was used in the preparation of the fibrous materials, temperatures of about 160° C. generally suffice. The pressure used depends upon the thickness of the material and upon the desired degree of compression or deformation (shaping) and as a consequence can vary within wide limits. In most instances this step of the process according to the invention can be carried out at temperatures of about 120 to about 190° C. and at pressures of 0.1 to about 150 kg./cm.$^2$. It often is expedient to cool the molded bodies under pressure at least to a temperature at which they possess sufficient intrinsic strength.

The drawing represents a flow diagram of the invention.

Special advantages are attained when the process according to the invention is carried out continuously. In this instance apparatus can be employed such as used in the paper making industry. Such apparatus essentially consists of the following elements: (1) a pulp suspension vessel in which the fibres are suspended in an aqueous medium and in which the polymerization can be carried out after addition of the monomer or monomer/polymer emulsion; (2) a travelling screen as in a Fourdrinier machine to which the prepared suspension is supplied from such vessel and on which the water is separated off, if desired, with the aid of vacuum; (3) an elongated drying chamber in which the remainder of water remaining in the fleece formed is removed; and (4) a press or calender which may be heated arranged behind the drying chamber. When such apparatus is employed, molded materials and especially pressed plates can be produced in a simple manner at a high rate of production. The plates produced can then be further shaped thermoplastically. Of course, the fleece can be used for other purposes without pressing.

Fibre materials, such as can be used in the production of paper, are suitable for the fibrous material employed according to the invention, for example, gray paper pulp, mechanical wood pulp, cellulose, wood flour, wood fibres, textile fibres of vegetable or animal origin, synthetic fibres, fibres obtained from leather scraps, asbestos flour and fibres. Glass fibres can also be used. The thickness of the fibres and their length can be selected with reference to the desired properties of the final product. It is expedient to employ fibres in as fine a state of distribution as possible. If desired, they may also be subjected to a pretreatment to facilitate the polymerization of the monomer or monomer/polymer thereon. In addition to purely mechanical pretreatments, they may, for example, include the use of a "finish" on glass fibres or a preswelling of organic or synthetic fibres in solvents or monomers.

All monomers which cure through vinyl polymerization are included in the liquid polymerizable organic compounds containing at least one terminal $CH_2=C<$ group. In addition to vinyl chloride and vinyl acetate, as well as acrylonitrile, styrene, vinyl toluene and other styrene derivatives can also be used. The lower alkyl esters of acrylic and methacrylic acid are especially suited. Methyl methacrylate is preferably used. These monomeric materials, according to a preferred modification of the process according to the invention, can contain their polymers singly or a plurality or their copolymers dissolved therein. Polymethyl methacrylate again is most preferred as such a dissolved polymer. Up to about 150 parts by weight of polymer can be employed per 100 parts by weight of monomer. In the event that the polymer is not soluble in the monomer an appropriate mixture can be employed to effect the solution.

It is especially advantageous to employ a monomer/polymer solution in the form of a syrupy prepolymerizate formed by partial polymerization of the monomer in the presence of azodiisobutyric acid nitrile and, if desired, a regulator, perferably a mercaptan such as lauryl mercaptan or the dimercapto acetic acid ester of glycol. The preparation of such prepolymers is known and is, for example, described in German published application 1,083,057.

The quantities of the polymerizable component can vary within very wide limits. Depending upon the quantities, fleeces or molded bodies can be produced which, in the first instance, primarily exhibit the character of the fibrous material employed and, in the second instance, primarily exhibit the character of the resin produced. Bodies can, for example, be obtained when paper fibres and relatively small quantities of polymerizable component are used which resemble paper and when larger quantities of polymerizable component are used bodies can be obtained which are of the character of resins reenforced with paper. In the first instance a paper is obtained having good tensile strength also in the wet state, good extension values, bursting strengths, resistance to tearing, as well as low wettability with water. In the other instance, a resinous product is obtained, the mechanical values of which are only, at most, slightly below that of the pure resin with the advantage of quick production at a favorable cost. The quantity of polymerizable component only depends upon the use to which the end product is to be placed.

As already indicated, the polymerization is carried out with the co-use of a catalyst. Such catalyst can consist of a peroxidic compound. In such case raised temperatures must be employed to initiate the polymerization and therefore sole use of peroxidic catalysts is not preferred. Nevertheless, even in such case with proper selection of the peroxidic compound polymerization times of only 2 hours can be achieved at 60° C. Expediently such a polymerization is carried out in a closed vessel provided with a reflux condenser. It is considerably more advantageous to effect a so-called cold curing. The catalyst systems required for such cold curing are known from the bulk polymerization procedures. Advantageously so-called redox systems are employed which expediently consist of a peroxidic compound as oxidizing component and a tertiary amine preferably carrying at least one aromatic radical as reducing component. The polymerizations can be carried out in extraordinarily short periods of time with the aid of such systems, which again is of advantage when the process is to be carried out continuously. The quantities of catalyst or catalyst system employed are about the same as those used in known bulk polymerization procedures.

Examples of suitable peroxidic compounds, for instance, are, above all, diacyl peroxides such as benzoyl peroxide, 4,4-parachlorobenzoyl peroxide, 2,4-dihclorobenzoyl peroxide, lauroyl peroxide, as well as alkyl acyl peroxides such as tertiary butyl perbenzoate, tertiary butyl peracetate and the like.

As amine components of the redox systems, tertiary amines are employed with advantage, especially those carrying an aromatic radical directly bound to the nitrogen atom. Examples of such amines are: diethylol-p-toluidine, diisopropylol-p-toluidine, diisopropylol-m-toluidine, di-n-butylol-m-toluidine, dimethyl aniline, dimethyl-p-toluidine, di-n-butylol-p-toluidine.

In addition to the above mentioned components, the catalyst systems can also contain the following other components: organic copper compounds or compounds containing a labile chlorine atom such as disclosed in Bader, U.S. application S.N. 115,088, filed June 6, 1961. Furthermore, alcohols and organic sulfur compounds may also be added.

The pressed bodies produced according to the invention can be subjected to further thermoplastic deformation (shaping). They furthermore may be processed by sawing, planing, polishing and the like. They are also capable of being welded when the polymerizable components employed form resins suited for welding. However, a material which is not weldable per se can be rendered so by application of weldable synthetic resin plates or foils on one or both sides thereof. For this purpose it is also possible to use woven or paper webs which have been impregnated with such synthetic resins. Such laminations may also be provided for other purposes, for example, to provide certain surface characteristics or to obtain optical effects. The application of further layers can already be effected when the product is still in the form of a fleece. The bonding of such layers with the fleece in this instance is effected during the pressing or molding operation. However, it is also possible to bond the bodies which already have been pressed or molded with further layers by the reapplication of heat and pressure.

*Example 1*

26 parts by weight of a stock emulsion were added to a paper fibre pulp consisting of 10 parts by weight of paper and 400 parts by weight of water. The stock emulsion was prepared from the following components:

50 parts by weight of a solution of polymethacrylate (30% in monomeric methyl methacrylate)

2 parts by weight benzoyl peroxide paste (50% in dibutyl phthalate)

1 part by weight anionic emulsifier (sodium salt of tetra propylene benzene sulphonic acid).

These components were thoroughly mixed by a propeller stirrrer and emulsified with use of 47 parts of water.

The emulsion was precipitated with 2 to 5% (based on the total bath) of a 20% calcium chloride solution as soon as an equal dispersion in the total mixture had been obtained whereby the precipitation solution was slowly added within 15 minutes. 0.5% of an accelerator emulsion which contained 10 parts by weight of dimethyl-p-toluidine emulsified in water was then added to the total bath at room temperature. An ethoxylated castor oil with 40% ethylene oxide was used as emulsifier for the accelerator. The mixture which had meanwhile been polymerized was put on a sieve and thoroughly sucked off after a period of 1½ hours.

This process may be varied by adding the accelerator emulsion before the precipitation with calcium chloride.

The fleece obtained according to this process consisted of 63.4 parts of paper fibre and 36.6 parts of resin. It had a tensile strength of 58.5 kg./cm.$^2$ before it was pressed and it absorbed 108% of water after storage in water for 2 hours. If this fleece is pressed within 5 minutes at a temperature of 180° C. and at a pressure of 150 kg./cm.$^2$, a moulded material with a tensile strength of 238 kg./cm.$^2$ is obtained. The water absorption of this product was 35% by weight after 2 hours' storage in water.

If the same paper suspension is processed without the addition of the resin according to this invention, a fleece with a tensile strength of 36.8 kg./cm.$^2$ is obtained. After the pressing under the above-mentioned conditions, the tensile strength was only 81.2 kg./cm.$^2$.

*Example 2*

A paper fibre pulp like in Example 1 was used, however, instead of the resin emulsion were added thereto as mentioned above 25 parts of an emulsion the composition of which is as follows:

25 parts by weight of a copolymer consisting of 70% of methyl methacrylate and 30% of butadiene
7.5 parts by weight polymethyl methacrylate
17.5 parts by weight monomeric methyl methacrylate
1.5 parts by weight benzoyl peroxide paste (50% in dibutyl phthalate)
1.25 parts by weight of the sodium salt of sulfuric acid ester of the lauric alcohol as emulsifier.

These components were thoroughly mixed by a propeller stirrer to form a complete solution and then emulsified by the addition of 47.25 parts of water.

The further treatment was like in Example 1.

A fleece consisting of 46.5 parts of paper fibres and 53.5 parts of resin by weight was obtained. After a pressing time of 5 minutes at a temperature of 180° C. and at a pressure of 100 kg./cm.$^2$ a moulded material with a tensile strength of 310 kg./cm.$^2$ was obtained. The water absorption was 37.5% (based on the initial weight) after 2 hours' storage in water.

*Example 3*

A mixture consisting of:

35 parts by weight of a monomesic methyl methacrylate
15 parts by weight copolymer consisting of 15% vinyl acetate and 85% vinyl chloride
2 parts by weight benzoyl peroxide paste (50% in dibutyl phthalate)
2 parts by weight sodium salt of tetrapropylene benzene sulfonic acid
46 parts by weight water was used as the resin emulsion.

The organic components were thoroughly stirred to a complete solution and then emulsified after addition of water. 10 parts of this stock emulsion were added to a paper fibre pulp consisting of 10 parts of paper and 400 parts of water. The further treatment was like in Example 1.

A fleece consisting of 80.2 parts of paper fibres and 19.8 parts of resin was obtained. The tensile strength was 77.5 kg./cm.$^2$ in unpressed condition of the fleece, and the water absorption was 112% after a 2 hours storage in water. After the pressing of the fleece during 5 minutes at a temperature of 180° C. and at a pressure of 100 kg./cm.$^2$ a molded material which had a tensile strength of 168 kg./cm.$^2$ was obtained and a water absorption of 36% after 2 hours storage in water.

*Example 4*

The processing was similar to that in Exampule 1, however, instead of the paper fibre pulp, a suspension of 10 parts of cotton flocks in 400 parts of water was used. 25 parts of a stock emulsion were added thereto the composition of which was the same as in Example 1.

The further treatment was as in Example 1.

A fleece consisting of 67% of cotton flocks and 33% of resin was obtained.

After a pressing time of 5 minutes at a temperature of 180° C. and at a pressure of 150 kg./cm.$^2$ a tensile strength of 164 kg./cm.$^2$ was attained. The absorption of water was 23% after a storage in water of 2 hours.

A fleece which had been produced by use of cotton flocks, however without addition of resin had a tensile strength after the pressing (5 minutes, 180° C., 150 kg./cm.$^2$) of 1.25 kg./cm.$^2$ and an absorption of water of 159%.

I claim:

1. A process for the production of fibrous material associated with a thermoplastic resin suitable for the production of heat and pressure shaped products which comprises incorporating a peroxidic catalyst in a liquid monomer containing at least one terminal $CH_2=C<$ group which is polymerizable to a thermoplastic resin, preparing an aqueous suspension of fibrous material, preparing an aqueous emulsion of the liquid monomer containing the peroxidic catalyst, mixing said aqueous fibre suspension and said aqueous emulsion of said liquid monomer, breaking the emulsion of said liquid monomer in contact with said aqueous fibre dispersion in said mixture, initiating polymerization of such monomer containing the peroxidic catalyst in such aqueous fibre suspension, after completion of such polymerization removing water from the suspension to produce a fleece from the fibrous material associated with the polymerization product and drying such fleece at temperatures below the thermoplastic range of the polymerization product associated with the fibrous material.

2. The process of claim 1 comprising in addition subjecting such fleece to pressure and a temperature at which such polymerization product is thermoplastic.

3. The process of claim 1 in which said polymerization is carried out in the presence of an accelerator in addition to the peroxidic catalyst.

4. The process of claim 1 in which such aqueous suspension also contains a polymer of such monomer suspended therein.

5. The process of claim 1 in which said polymerization is carried out in contact with a redox system comprising a peroxidic catalyst and a tertiary amine.

6. The process of claim 1 in which such monomer is methyl methacrylate.

7. The process of claim 6 in which such methyl methacrylate has polymethyl methacrylate dissolved therein.

8. The process of claim 7 in which polymethyl methacrylate solution in methyl methacrylate is in the form of a prepolymer formed by partial polymerization of methyl methacrylate.

References Cited by the Examiner

UNITED STATES PATENTS

| | | | |
|---|---|---|---|
| 2,170,755 | 8/1939 | Hanson | 162—185 |
| 2,624,686 | 1/1953 | Kamlet | 162—164 |
| 2,684,305 | 7/1954 | Quinlivan. | |
| 2,998,344 | 8/1961 | Carlson. | |
| 2,999,789 | 9/1961 | Bath | 162—183 |
| 3,083,118 | 3/1963 | Bridgeford | 162—168 |
| 3,121,658 | 2/1964 | Orsino et al. | 162—183 |

FOREIGN PATENTS 462,004   12/1949   Canada.

DONALL H. SYLVESTER, *Primary Examiner.*

MORRIS O. WOLK, *Examiner.*

S. L. BASHORE, *Assistant Examiner.*